(12) United States Patent
Kim et al.

(10) Patent No.: US 12,496,875 B2
(45) Date of Patent: Dec. 16, 2025

(54) REFRIGERANT CIRCULATING APPARATUS OF VEHICLE

(71) Applicants: HYUNDAI MOTOR COMPANY, Seoul (KR); KIA CORPORATION, Seoul (KR); HANON SYSTEMS, Daejeon (KR); DOOWON CLIMATE CONTROL CO., LTD., Asan-si (KR)

(72) Inventors: Jeawan Kim, Hwaseong-si (KR); Dongwook Lee, Hwaseong-si (KR); Wan Je Cho, Hwaseong-si (KR); Yeonho Kim, Seoul (KR); Hoyoung Jeong, Hwaseong-si (KR); Man Hee Park, Suwon-si (KR); Yeong Jun Kim, Incheon (KR); Jae Yeon Kim, Hwaseong-si (KR); Hochan An, Hwaseong-si (KR); Hae Jun Lee, Daedeok-gu (KR); Sang Gu Woo, Daedeok-gu (KR); Moo Joong Kim, Daedeok-gu (KR); Won Suk Lee, Cheonan-si (KR); Soon-Jong Lee, Yesan-gun (KR); Tae Min Park, Asan-si (KR)

(73) Assignees: Hyundai Motor Company, Seoul (KR); Kia Corporation, Seoul (KR); Hanon Systems, Daedeok-gu (KR); Doowon Climate Control Co., LTD., Asan-si (KR)

( * ) Notice: Subject to any disclaimer, the term of this patent is extended or adjusted under 35 U.S.C. 154(b) by 146 days.

(21) Appl. No.: 18/381,891

(22) Filed: Oct. 19, 2023

(65) Prior Publication Data

US 2024/0416722 A1    Dec. 19, 2024

(30) Foreign Application Priority Data

Jun. 16, 2023  (KR) .......................... 10-2023-0077171

(51) Int. Cl.
*B60H 1/00* (2006.01)
*B60H 1/32* (2006.01)

(52) U.S. Cl.
CPC ....... *B60H 1/00899* (2013.01); *B60H 1/3229* (2013.01)

(58) Field of Classification Search
CPC .............. B60H 1/00899; B60H 1/3229; B60H 1/00485; B60H 1/00571; B60H 1/00357;
(Continued)

(56) References Cited

U.S. PATENT DOCUMENTS 3,728,746 A * 4/1973 Konen ...................... E03C 1/04
4/677
11,192,425 B2 * 12/2021 Oh ..................... B60H 1/00007
(Continued)

FOREIGN PATENT DOCUMENTS

CN  213778220 U  *  7/2021
KR  20090001783 U  *  2/2009

*Primary Examiner* — Kun Kai Ma
(74) *Attorney, Agent, or Firm* — Fish & Richardson P.C.

(57) ABSTRACT

A refrigerant circulating apparatus of a vehicle includes a compressor configured to compress a refrigerant, at least one heat-exchanger configured to exchange with the refrigerant, at least one valve configured to selectively provide the refrigerant to the at least one heat-exchanger, a bracket that supports the compressor, and a fluid line plate that is coupled to the bracket and disposed adjacent to the at least one heat-exchanger and the at least one valve. The fluid line plate includes a plurality of fluid lines defined inside the fluid line plate and configured to provide the refrigerant to the at least one heat-exchanger based on operation of the at least one valve.

20 Claims, 6 Drawing Sheets

(58) Field of Classification Search
CPC ...... B60H 1/323; B60H 1/3223; B60H 41/20; B60H 41/31; B60H 43/00; F16F 15/08; B60Y 2304/01; B60Y 2304/072
See application file for complete search history.

(56) References Cited

U.S. PATENT DOCUMENTS

| | | | |
|---|---|---|---|
| 11,440,376 B2* | 9/2022 | Calderone | F25B 41/40 |
| 11,453,267 B2* | 9/2022 | Koberstein | B60H 1/00907 |
| 12,083,860 B2* | 9/2024 | Kim | B60H 1/3229 |
| 2008/0210405 A1* | 9/2008 | Datta | F28D 15/0266 |
| | | | 257/E23.098 |
| 2019/0039440 A1* | 2/2019 | Calderone | B60H 1/3229 |
| 2022/0194167 A1* | 6/2022 | Morimoto | B60H 1/00571 |
| 2022/0332162 A1* | 10/2022 | Lee | B60H 1/00278 |
| 2022/0377946 A1* | 11/2022 | Artmeier | B60H 1/00485 |
| 2024/0167769 A1* | 5/2024 | Rhee | B60K 11/02 |
| 2024/0181846 A1* | 6/2024 | Lee | B60H 1/32284 |

* cited by examiner

REFRIGERANT CIRCULATING APPARATUS OF VEHICLE

CROSS-REFERENCE TO RELATED APPLICATION

This application claims priority to and the benefit of Korean Patent Application No. 10-2023-0077171, filed in the Korean Intellectual Property Office on Jun. 16, 2023, the entire contents of which are incorporated herein by reference.

TECHNICAL FIELD

The present disclosure relates to a refrigerant circulating apparatus of a vehicle, and more particularly, to a refrigerant circulating apparatus of a vehicle, which is included in an air conditioning system applied for cooling and heating of the vehicle interior of a purpose-built vehicle (PBV), and capable of minimizing use of piping while improving mountability of each constituent element.

BACKGROUND

The vehicle industry has been introducing a new concept of future mobility vision for realizing a human-centered and dynamic future city.

One of these future mobility solutions is a purpose-built vehicle (PBV) as purpose-based mobility.

The PBV indicates an eco-friendly mobility solution that provides customized services for occupants while they travel to their destination on the ground, and may set optimal paths for each situation and perform platooning using electric vehicle-based artificial intelligence.

For instance, the PBV may be a means of transportation and a fixed facility with case-related techniques, and a separate driver seat may be unnecessary as it has an autonomous driving function. In addition, an indoor space thereof may have expandability.

In some cases, a PBV may perform a role of a shuttle that moves a large number of people, and may also be changed to a recreational space such as a restaurant, a cafe, a hotel, and a movie theater, and an essential facility such as a hospital and a pharmacy.

In some cases, the PBV may be powered by an electric motor, and may include a skateboard-like rolling chassis (referred to as an underbody or skateboard in the art) with batteries spreading on a lower portion thereof and an upper body where occupants can board.

In some cases, where the PBV includes an air conditioning system for controlling the indoor temperature of the upper body, it may be difficult to position components included in a refrigerant circulating apparatus of the air conditioning system in a narrow mounting space, and a layout of pipes through which a refrigerant flows may become complicated.

In addition, some components of the refrigerant circulating apparatus may be mounted on the upper body due to limitation of the mounting space of the rolling chassis, and thus an internal space of the upper body is reduced.

A technique for mounting on a rolling chassis may simplify piping of the refrigerant circulating apparatus and promote modularization.

SUMMARY

The present disclosure has been made in an effort to provide a refrigerant circulating apparatus of a vehicle, which is included in an air conditioning system applied for cooling and heating of the vehicle interior of a purpose-built vehicle (PBV), and capable of minimizing use of piping while improving mountability of each constituent element.

According to one aspect of the subject matter described in this application, a refrigerant circulating apparatus of a vehicle includes a compressor configured to compress a refrigerant, at least one heat-exchanger configured to exchange with the refrigerant, at least one valve configured to selectively provide the refrigerant to the at least one heat-exchanger, a bracket that supports the compressor, and a fluid line plate that is coupled to the bracket and disposed adjacent to the at least one heat-exchanger and the at least one valve. The fluid line plate includes a plurality of fluid lines defined inside the fluid line plate and configured to provide the refrigerant to the at least one heat-exchanger based on operation of the at least one valve.

Implementations according to this aspect can include one or more of the following features. For example, the bracket can include a mounting portion to which the compressor is fixed, and a plate coupling portion connected to the mounting portion and coupled to the fluid line plate. In some examples, the mounting portion can be disposed perpendicular to the plate coupling portion.

In some implementations, the plate coupling portion can define (i) a plurality of first penetration holes configured to supply the refrigerant to the compressor or to receive the refrigerant from the compressor, and (ii) a plurality of first grooves defined at an inner surface of the plate coupling portion and connected to one or more of the plurality of first penetration holes, where the inner surface of the plate coupling portion faces the fluid line plate. In some examples, the fluid line plate can define (i) a plurality of second penetration holes configured to communicate with the at least one heat-exchanger and the at least one valve, and (ii) a plurality of second grooves defined at an inner surface of the fluid line plate and connected to one or more of the plurality of second penetration holes, where the inner surface of the fluid line plate faces the plate coupling portion.

In some examples, shapes of the plurality of first grooves are identical to shapes of the plurality of second grooves, respectively. In some examples, the plurality of first grooves are coupled to the plurality of second grooves, respectively, to thereby define the plurality of the fluid lines in a state in which the fluid line plate is coupled to the plate coupling portion.

In some implementations, the refrigerant circulation apparatus can further include at least one bush unit disposed at the mounting portion and configured to reduce transmission of vibration generated by the compressor. In some examples, the at least one bush unit includes an insulator disposed at the mounting portion and a stud bolt coupled to a center of the insulator. In some implementations, the mounting portion can define at least one open hole.

In some implementations, the at least one heat-exchanger is configured to exchange heat between a coolant and the refrigerant in the plurality of fluid lines to thereby condensate or evaporate the refrigerant. In some examples, the at least one heat-exchanger can include a first heat-exchanger configured to condensate or evaporate the refrigerant supplied through the plurality of fluid lines, a second heat-exchanger configured to condensate or evaporate the refrigerant supplied through the plurality of fluid lines from the compressor or the first heat-exchanger, and a third heat-exchanger configured to condensate or evaporate the refrigerant supplied through the plurality of fluid lines from the compressor or the first heat-exchanger.

In some examples, the at least one valve includes a first valve and a second valve that are connected to the compressor and the first to third heat-exchangers via the plurality of fluid lines, where the first valve and the second valve are configured to selectively supply the refrigerant from the compressor to at least one of the first heat-exchanger, the second heat-exchanger, or the third heat-exchanger. In some examples, the first valve and the second valve are configured to control movement of the refrigerant or to expand the refrigerant introduced into the plurality of fluid lines.

In some implementations, the refrigerant circulation apparatus can further include a gas-liquid separator configured to separate a gaseous refrigerant or a liquid refrigerant from the refrigerant that is condensed or evaporated while passing through the at least one heat-exchanger. In some examples, the gas-liquid separator is connected to the compressor and the at least one heat-exchanger through the plurality of fluid lines. In some examples, the at least one heat-exchanger, the at least one valve, and the gas-liquid separator are disposed at an outer surface of the fluid line plate.

In some implementations, an inner surface of the fluid line plate and an inner surface of the bracket can face and contact each other to thereby define the plurality of fluid lines therebetween. In some implementations, the bracket has an L-shape that defines a first surface and a second surface orthogonal to the first surface, where the fluid line plate has a planar shape and is coupled to one of the first surface or the second surface of the bracket. In some examples, the compressor includes one or more connecting members that connect the compressor to the first surface and the second surface of the bracket.

In some implementations, with the refrigerant circulating apparatus of a vehicle, which is included in an air conditioning system applied for cooling and heating of the vehicle interior of a purpose-built vehicle (PVB), it may be possible to reduce a manufacturing cost by minimizing use of piping while improving mountability of each constituent element.

In some examples, it may be possible to minimize heat loss that may occur while the refrigerant moves by minimizing the use of a pipe through which the refrigerant is circulated.

In some examples, it may be also possible to simplify a layout in a narrow space in the front of a vehicle, and improve mountability, assembling capability, and maintainability by promoting modularization of the refrigerant circulating apparatus.

In some examples, it may be possible to maximize an indoor space of a vehicle that can be applied for various purposes by mounting the refrigerant circulating apparatus modularized in a purpose-built vehicle (PBV) on a vehicle body.

DETAILED DESCRIPTION

One or more implementations will hereinafter be described in detail with reference to the accompanying drawings.

Figure 1:
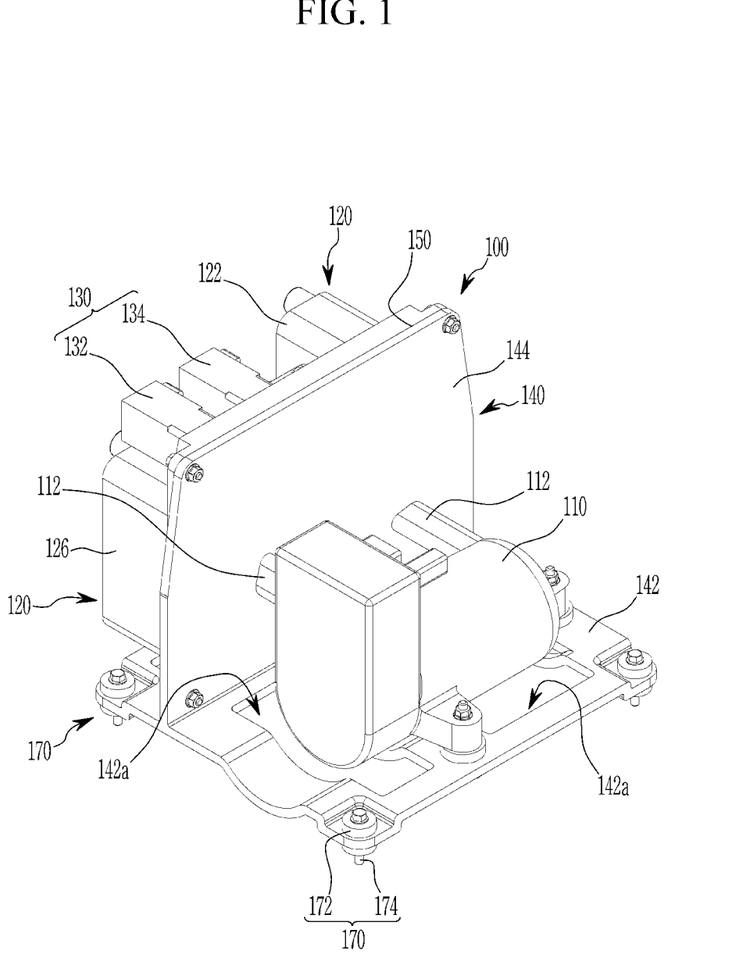
FIG. 1 is a perspective view showing an example of a refrigerant circulating apparatus of a vehicle.
Figure 2:
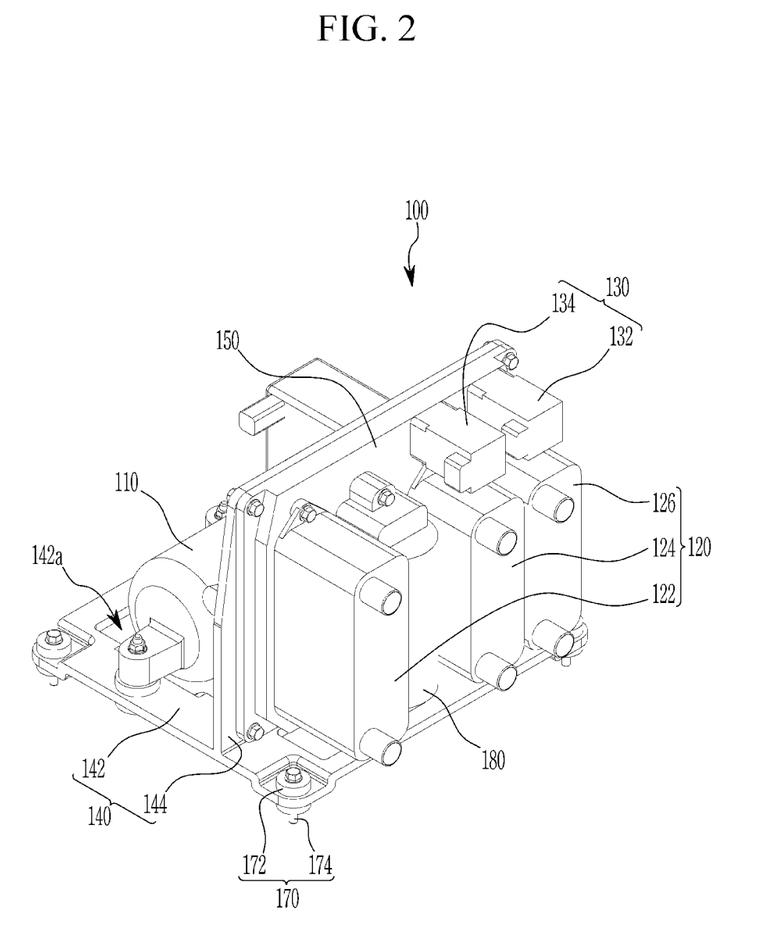
FIG. 2 is a perspective view of the refrigerant circulating apparatus, viewed from another angle.
Figure 3:
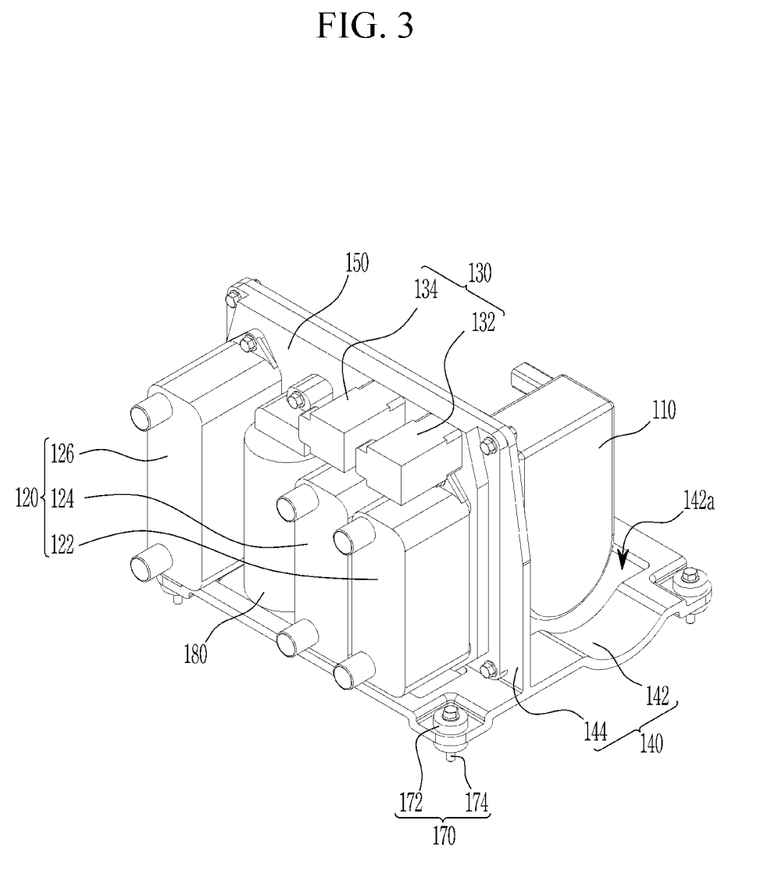
FIG. 3 is a perspective view of the refrigerant circulating apparatus, viewed from still another angle.
Figure 4:
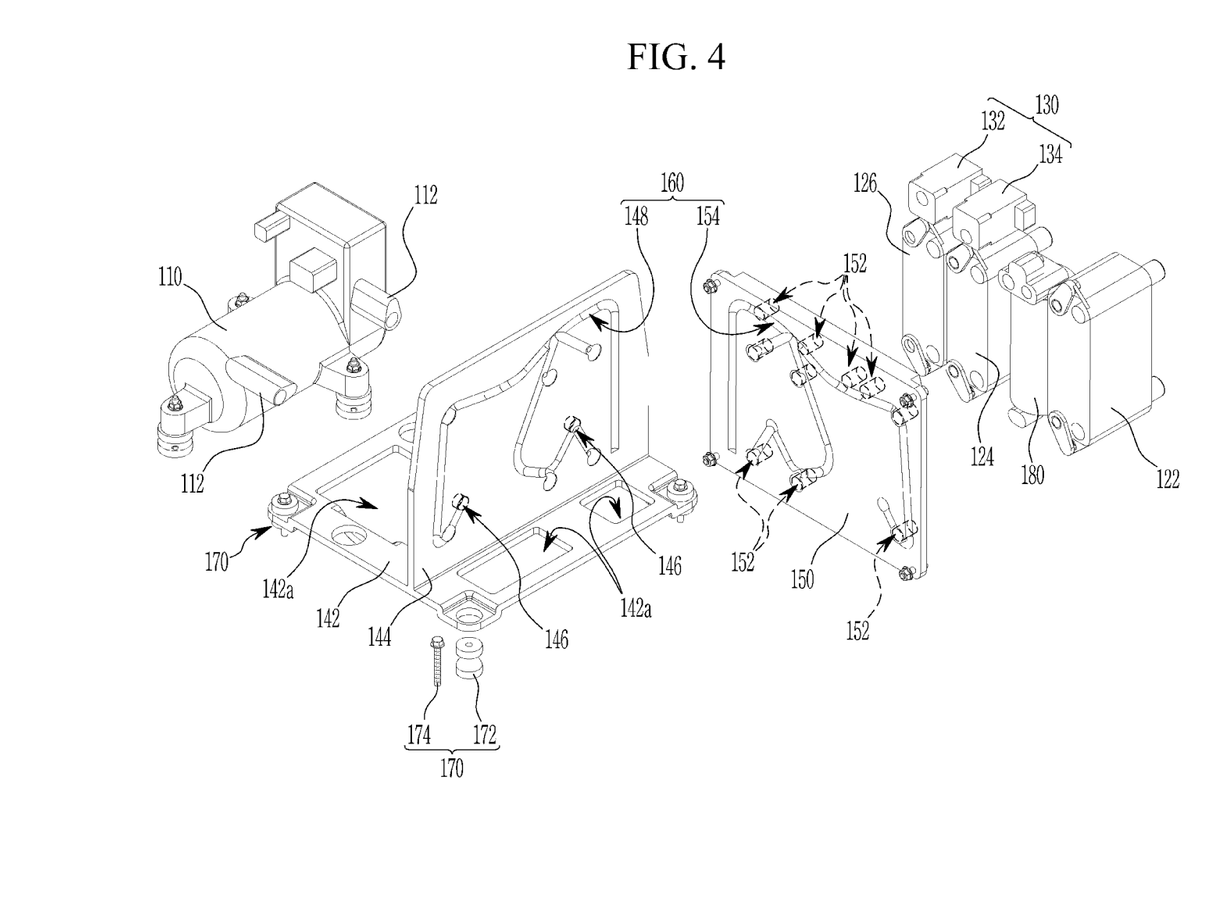
FIG. 4 is an exploded perspective view of the refrigerant circulating apparatus.
Figure 5:
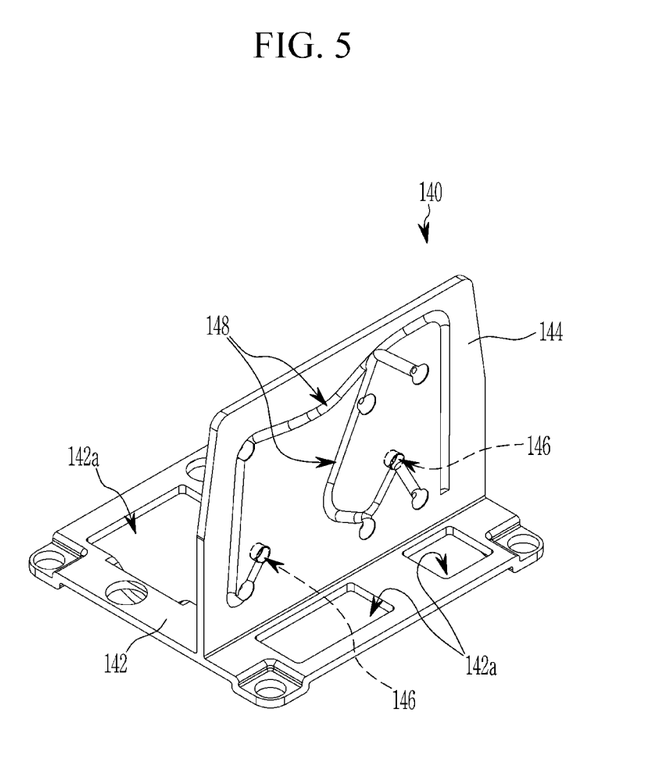
FIG. 5 is a perspective view showing an example of a bracket.
Figure 6:
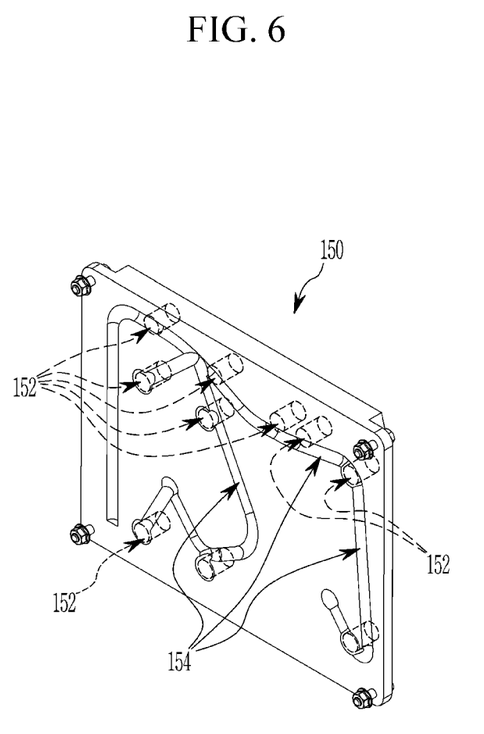
FIG. 6 is a perspective view showing an example of a fluid line plate.

FIG. 1 is a perspective view showing an example of a refrigerant circulating apparatus of a vehicle. FIG. 2 is a perspective view of a refrigerant circulating apparatus, viewed from another angle. FIG. 3 is a perspective view of a refrigerant circulating apparatus, viewed from still another angle. FIG. 4 is an exploded perspective view of a refrigerant circulating apparatus. FIG. 5 is a perspective view showing an example of a bracket. FIG. 6 is a perspective view showing an example of a fluid line plate.

In some implementations, the refrigerant circulating apparatus may be applied to, e.g., purpose-based mobility (purpose-built vehicle: hereinafter referred to as PBV).

The PBV is an electric vehicle-based eco-friendly mobile vehicle that provides customized services for passengers while they travel to their destination on the ground.

The PBV may be capable of setting an optimal path for each situation and performing platooning, and furthermore, may be a box-type design vehicle having a large interior space.

Such a PBV includes a skateboard-like rolling chassis (also referred to as an underbody in the art) and an upper body mounted on the rolling chassis.

A battery assembly may be mounted on the rolling chassis, and a driving motor may be installed.

In some implementations, referring to FIG. 1 to FIG. 6, a refrigerant circulating apparatus 100 can be provided in an air conditioning system applied for cooling and heating of the vehicle interior of the purpose-built vehicle (PBV), and configured to improve mountability of each constituent element and simultaneously, to reduce the manufacturing cost by minimizing use of piping.

In some implementations, a refrigerant circulation apparatus 100 can include a compressor 110, at least one heat-exchanger 120, at least one valve 130, a bracket 140, and a fluid line plate 150.

First, the compressor 110 may compress the introduced refrigerant. The at least one heat-exchanger 120 may heat-exchange the introduced refrigerant with coolant.

The at least one heat-exchanger 120 condenses or evaporates the refrigerant introduced therein through heat-exchange with a coolant.

That is, the at least one heat-exchanger 120 may be a water-cooled heat-exchanger for exchanging the introduced refrigerant with the coolant.

In some implementations, the at least one valve 130 may be provided to selectively flow the refrigerant through the at least one heat-exchanger 120. The at least one valve 130 may control a flow of the refrigerant or may selectively expand the introduced refrigerant.

The bracket 140 may be mounted in a vehicle body. The compressor 110 may be mounted on the bracket 140.

Here, the bracket 140 may include a mounting portion 142 and a plate coupling portion 144.

First, the compressor 110 may be seated and fixed on the mounting portion 142.

At least one open hole 142a may be formed in the mounting portion 142. The at least one open hole 142a may be applied in order to the overall weight of the bracket 140.

In addition, the plate coupling portion 144 is integrally formed with the mounting portion 142.

Here, the mounting portion 142 may be formed perpendicular to the plate coupling portion 144.

The plate coupling portion 144 may include a plurality of first penetration holes 146 and a plurality of first grooves 148.

The plurality of first penetration holes 146 may be formed in the plate coupling portion 144 to supply the refrigerant to the compressor 110 or receive the refrigerant from the compressor 110.

That is, the compressor 110 is mounted on the mounting portion 142, and may be connected to the first penetration hole 146 through a connecting member 112, on an outer surface of the plate coupling portion 144.

In addition, the first groove 148 is provided in a plural quantity, and may be selectively connected to the first penetration holes 146 on an inner surface of the plate coupling portion 144 facing the fluid line plate 150.

In some implementations, the at least one heat-exchanger 120 and the at least one valve 130 are mounted on an outer surface of the fluid line plate 150. The fluid line plate 150 may be coupled to the plate coupling portion 144.

Here, the fluid line plate 150 may be formed in a shape similar to that of the plate coupling portion 144.

A plurality of fluid lines 160 may be formed in an interior of the fluid line plate 150, in a state of being coupled to the plate coupling portion 144 with each other, so as to flow the refrigerant to the at least one heat-exchanger 120 by a selective operation of the at least one valve 130.

Here, the fluid line plate 150 may include a plurality of second penetration holes 152 and a plurality of second grooves 154.

First, the second penetration hole 152 is provided in a plural quantity, may be formed on the fluid line plate 150, to correspond to the at least one heat-exchanger 120 and the at least one valve 130.

Here, the at least one heat-exchanger 120 and the at least one valve 130 may be mounted on the outer surface of the fluid line plate 150 through the plurality of second penetration holes 152.

In addition, the plurality of second grooves 154 may be selectively connected to the second penetration holes 152 on an inner surface facing the plate coupling portion 144.

In some implementations, the first grooves 148 and the second grooves 154 may be formed to have the same shape as each other.

In addition, the first grooves 148 and the second grooves 154 may form the plurality of fluid lines 160 through which the refrigerant flows in a state in which the plate coupling portion 144 and the fluid line plate 150 are coupled.

In some implementations, the at least one heat-exchanger 120 may include a first heat-exchanger 122, a second heat-exchanger 124, and a third heat-exchanger 126.

First, the first heat-exchanger 122 may condensate or evaporate the refrigerant selectively supplied through the fluid lines 160 from the compressor 110.

The second heat-exchanger 124 and the third heat-exchanger 126 may condensate or evaporate the refrigerant selectively supplied through the fluid lines 160 from the compressor 110 or the first heat-exchanger 122.

Here, the first heat-exchanger 122, the second heat-exchanger 124, and the third heat-exchanger 126 may be selectively supplied with the refrigerant from the fluid lines 160 by the operation of the at least one valve 130.

That is, the compressor 110, the first heat-exchanger 122, the second heat-exchanger 124, and the third heat-exchanger 126 may be interconnected through the fluid lines 160 according to the selective operation of the at least one valve 130.

The first heat-exchanger 122, the second heat-exchanger 124, and the third heat-exchanger 126 may be selectively supplied with the refrigerant from the compressor 110 by the at least one valve 130 operated depending on to a heating mode or a cooling mode of the vehicle.

As an example, when the refrigerant is supplied from the compressor 110 to the first heat-exchanger 122, the refrigerant having passed through the first heat-exchanger 122 may be introduced into the second heat-exchanger 124, or the third heat-exchanger 126.

In some implementations, the at least one valve 130 may include a first valve 132 and a second valve 134.

The first valve 132 and the second valve 134 may be connected between the compressor 110 and the first to third heat-exchangers 122, 124, and 126 through the fluid lines 160, so as to selectively inflow the refrigerant supplied from the compressor 110 to the first heat-exchanger 122, the second heat-exchanger 124, or the third heat-exchanger 126.

Here, the first valve 132 and the second valve 134 may control the flowing movement of the refrigerant, or selectively expand the introduced refrigerant.

That is, the first valve 132 and the second valve 134 may control flowing movement of the refrigerant introduced from the compressor 110 or the at least one heat-exchanger 12, and selectively expand the introduced refrigerant and flow the expanded refrigerant to the at least one heat-exchanger 120.

The first and second valves 132 and 134 may be mounted on the outer surface of the fluid line plate 150.

In some implementations, at least one bush unit 170 may be provided to the mounting portion 142 of the bracket 140, so as to minimize transmission of the vibration generated by the compressor 110 to the vehicle body.

That is, the bush unit 170 may minimize the transmission of the vibration generated by the compressor 110 to the vehicle body frame through the bracket 140.

The bush unit 170 may include an insulator 172 and a stud bolt 174.

First, an exterior circumference of the insulator 172 may be vulcanized and bonded to a bush hole formed in the mounting portion 142. The insulator 172 may be formed in a bridge shape and a cylindrical shape having a through hole, its material may be formed of a rubber material.

In addition, an exterior circumference of the stud bolt 174 may be vulcanized and bonded to a center of the insulator 172, and fastened to the vehicle body frame.

Accordingly, when the vibration is generated from the compressor 110 in a vertical direction, the insulator 172 may absorb the vertical vibration of the compressor 110.

In addition, the rest of vibration other than the vibration in the vertical direction generated from the compressor 110 is transferred to the insulator 172 through the stud bolt 174, and may be efficiently insulated by using the elastic force of the insulator 172.

In some implementations, the stud bolt 174 is described to be vulcanized and bonded to the insulator 172 of the bush unit 170, but is not limited thereto.

That is, instead of the stud bolt 174, an inner ring capable of being bolted to the center of the bush unit 170 may be vulcanized and bonded to the insulator 172.

In some implementations, the refrigerant circulation apparatus 100 may further include a gas-liquid separator 180 configured to separate gaseous refrigerant or liquid refrigerant from the refrigerant condensed or evaporated while passing through the first heat-exchanger 122, or the second heat-exchanger 124, or the third heat-exchanger 126.

In some implementations, the gas-liquid separator 180 may be mounted on an outer surface of the fluid line plate 150 between the first heat-exchanger 122 and the second heat-exchanger 124.

The refrigerant discharged from the first heat-exchanger 122, or the second heat-exchanger 124, or the third heat-exchanger 126 and flowing into the fluid line 160 may be introduced into the gas-liquid separator 180.

The gas-liquid separator 180 may be connected to the at least one valve 130 through the fluid lines 160, and connected to the compressor 110.

That is, the gas-liquid separator 180 may separate gaseous refrigerant and liquid refrigerant from the refrigerant having passed through the first heat-exchanger 122, or the second heat-exchanger 124, or the third heat-exchanger 126.

The gas-liquid separator 180 may supply the gaseous refrigerant among the refrigerant introduced from the first heat-exchanger 122, or the second heat-exchanger 124, or the third heat-exchanger 126 to the compressor 110.

Accordingly, the gas-liquid separator 180 may only supply the gaseous refrigerant to the compressor 110, thereby improving efficiency and durability of the compressor 110

With the refrigerant circulating apparatus, which is included in an air conditioning system applied for cooling and heating of the vehicle interior of a purpose-built vehicle (PVB), it may be possible to reduce a manufacturing cost by minimizing use of piping while improving mountability of each constituent element.

In addition, according to the present disclosure, it is possible to minimize heat loss that may occur while the refrigerant moves by minimizing the use of a pipe through which the refrigerant is circulated.

According to the present disclosure, it is also possible to simplify a layout in a narrow space in the front of a vehicle, and improve mountability, assembling capability, and maintainability by promoting modularization of the refrigerant circulating apparatus 100.

In addition, according to the present disclosure, it is possible to maximize an indoor space of a vehicle that can be applied for various purposes by mounting the refrigerant circulating apparatus 100 modularized in a purpose-built vehicle (PBV) on a vehicle body.

While this disclosure has been described in connection with what is presently considered to be practical implementations, it is to be understood that the disclosure is not limited to the disclosed implementations, but, on the contrary, is intended to cover various modifications and equivalent arrangements included within the spirit and scope of the appended claims.

What is claimed is:

1. A refrigerant circulating apparatus of a vehicle, comprising:
    a compressor configured to compress a refrigerant;
    at least one heat-exchanger configured to exchange with the refrigerant;
    at least one valve configured to selectively provide the refrigerant to the at least one heat-exchanger;
    a bracket that supports the compressor; and
    a fluid line plate that is coupled to the bracket and disposed adjacent to the at least one heat-exchanger and the at least one valve, the fluid line plate comprising a plurality of fluid lines defined inside the fluid line plate and configured to provide the refrigerant to the at least one heat-exchanger based on operation of the at least one valve,
    wherein an inner surface of the fluid line plate and an inner surface of the bracket contact each other to thereby define the plurality of fluid lines therebetween.

2. The refrigerant circulation apparatus of claim 1, wherein the bracket comprises:
    a mounting portion to which the compressor is fixed; and
    a plate coupling portion connected to the mounting portion and coupled to the fluid line plate.

3. The refrigerant circulation apparatus of claim 2, wherein the mounting portion is disposed perpendicular to the plate coupling portion.

4. The refrigerant circulation apparatus of claim 2, wherein the plate coupling portion defines:
    a plurality of first penetration holes configured to supply the refrigerant to the compressor or to receive the refrigerant from the compressor; and
    a plurality of first grooves defined at an inner surface of the plate coupling portion and connected to one or more of the plurality of first penetration holes, the inner surface of the plate coupling portion facing the fluid line plate.

5. The refrigerant circulation apparatus of claim 4, wherein the fluid line plate defines:
    a plurality of second penetration holes configured to communicate with the at least one heat-exchanger and the at least one valve; and
    a plurality of second grooves defined at an inner surface of the fluid line plate and connected to one or more of the plurality of second penetration holes, the inner surface of the fluid line plate facing the plate coupling portion.

6. The refrigerant circulation apparatus of claim 5, wherein shapes of the plurality of first grooves are identical to shapes of the plurality of second grooves, respectively.

7. The refrigerant circulation apparatus of claim 5, wherein the plurality of first grooves are coupled to the plurality of second grooves, respectively, to thereby define the plurality of the fluid lines in a state in which the fluid line plate is coupled to the plate coupling portion.

8. The refrigerant circulation apparatus of claim 2, further comprising at least one bush unit disposed at the mounting portion and configured to reduce transmission of vibration generated by the compressor.

9. The refrigerant circulation apparatus of claim 8, wherein the at least one bush unit comprises:
    an insulator disposed at the mounting portion; and
    a stud bolt coupled to a center of the insulator.

10. The refrigerant circulation apparatus of claim 2, wherein the mounting portion defines at least one open hole.

11. The refrigerant circulation apparatus of claim 1, wherein the at least one heat-exchanger is configured to exchange heat between a coolant and the refrigerant in the plurality of fluid lines to thereby condensate or evaporate the refrigerant.

12. The refrigerant circulation apparatus of claim 1, wherein the at least one heat-exchanger comprises:
    a first heat-exchanger configured to condensate or evaporate the refrigerant supplied through the plurality of fluid lines;
    a second heat-exchanger configured to condensate or evaporate the refrigerant supplied through the plurality of fluid lines from the compressor or the first heat-exchanger; and
    a third heat-exchanger configured to condensate or evaporate the refrigerant supplied through the plurality of fluid lines from the compressor or the first heat-exchanger.

13. The refrigerant circulation apparatus of claim 12, wherein the at least one valve comprises a first valve and a second valve that are connected to the compressor and the first to third heat-exchangers via the plurality of fluid lines, and wherein the first valve and the second valve are configured to selectively supply the refrigerant from the compressor to at least one of the first heat-exchanger, the second heat-exchanger, or the third heat-exchanger.

14. The refrigerant circulation apparatus of claim 13, wherein the first valve and the second valve are configured to control movement of the refrigerant or to expand the refrigerant introduced into the plurality of fluid lines.

15. The refrigerant circulation apparatus of claim 1, further comprising a gas-liquid separator configured to separate a gaseous refrigerant or a liquid refrigerant from the refrigerant that is condensed or evaporated while passing through the at least one heat-exchanger.

16. The refrigerant circulation apparatus of claim 15, wherein the gas-liquid separator is connected to the compressor and the at least one heat-exchanger through the plurality of fluid lines.

17. The refrigerant circulation apparatus of claim 16, wherein the at least one heat-exchanger, the at least one valve, and the gas-liquid separator are disposed at an outer surface of the fluid line plate.

18. The refrigerant circulation apparatus of claim 1, wherein the bracket has an L-shape that defines a first surface and a second surface orthogonal to the first surface, and wherein the fluid line plate has a planar shape and is coupled to one of the first surface or the second surface of the bracket.

19. The refrigerant circulation apparatus of claim 18, wherein the compressor comprises one or more connecting members that connect the compressor to the first surface and the second surface of the bracket.

20. A refrigerant circulating apparatus of a vehicle, comprising:

a compressor configured to compress a refrigerant;

at least one heat-exchanger configured to exchange with the refrigerant;

at least one valve configured to selectively provide the refrigerant to the at least one heat-exchanger;

a bracket that supports the compressor; and a fluid line plate that is coupled to the bracket and disposed adjacent to the at least one heat-exchanger and the at least one valve, the fluid line plate comprising a plurality of fluid lines defined inside the fluid line plate and configured to provide the refrigerant to the at least one heat-exchanger based on operation of the at least one valve, wherein the bracket comprises:

a mounting portion to which the compressor is fixed, and a plate coupling portion connected to the mounting portion and coupled to the fluid line plate, wherein the plate coupling portion defines:

a plurality of first penetration holes configured to supply the refrigerant to the compressor or to receive the refrigerant from the compressor, and a plurality of first grooves defined at an inner surface of the plate coupling portion and connected to one or more of the plurality of first penetration holes, the inner surface of the plate coupling portion facing the fluid line plate, and wherein the fluid line plate defines:

a plurality of second penetration holes configured to communicate with the at least one heat-exchanger and the at least one valve; and a plurality of second grooves defined at an inner surface of the fluid line plate and connected to one or more of the plurality of second penetration holes, the inner surface of the fluid line plate facing the plate coupling portion.

* * * * *